Patented Sept. 7, 1954

UNITED STATES PATENT OFFICE 2,688,647

2,688,647
NATURAL RUBBER PROCESSING AND RELATED COMPOSITIONS

Frank J. Heller, Bartlesville, Okla., assignor to Phillips Petroleum Company, a corporation of Delaware No Drawing. Application May 28, 1951,
Serial No. 228,779

31 Claims. (Cl. 260—754)

This invention relates to rubber antioxidants. In one embodiment this invention relates to a method for retarding oxidation of natural rubber. In another embodiment this invention relates to new vulcanizable natural rubber compositions. In still another embodiment this invention relates to new vulcanizates.

Rubber products, particularly the final vulcanized rubber products, decompose upon aging and lose necessary physical characteristics for which they were designed. Unless prevented, strong flexible vulcanized rubber changes to a hard brittle weak material; it loses its elasticity, it tears more easily, and its tensile strength decreases. To prevent such deterioration of vulcanized rubber products, age resistors or antioxidants are added. There are various known antioxidants some of which are used for special purposes, such as to prevent flex cracking, loss of tensile strength, and others of which are more of an all-purpose type in that they maintain to a great extent all of the physical properties of the vulcanized rubber products. Known antioxidants are of numerous different classes of chemical compounds, such as waxes, phenols, aldehydeamines, dihydroquinolines, and the like.

This invention is concerned with a method for increasing age resistance of natural rubber, and further with natural rubber compositions containing new antioxidants.

An object of this invention is to provide for increasing age resistance of natural rubber. Another object is to provide vulcanizable natural rubber compositions. Another object is to provide new vulcanizates. Still another object is to provide new rubber antioxidants. Still another object is to provide as an antioxidant for natural rubber the reaction product of a sulfenyl halide and a selected substituted amine. Other objects will be apparent to those skilled in the art from the accompanying discussion and disclosure.

Broadly, I have discovered that the age resistance of natural rubber can be increased by incorporating therewith a sulfenamide characterized by the structural formula

and containing not more than 30 carbon atoms in the molecule, wherein R is a hydrocarbon radical containing from 2 to 10 carbon atoms and wherein each R' is selected from the group consisting of H and a hydrocarbon alkenyl radical containing from 3 to 20 carbon atoms, and wherein not more than one R' is H. Compositions of natural rubber processed with these sulfenamide materials, either vulcanized or unvulcanized, are new compositions of my invention.

In a preferred embodiment of my invention, R in the formula

contains from 2 to 6 carbon atoms, and R' when an alkenyl radical contains from 3 to 8 carbon atoms. In any case the alkenyl radical can be monoolefinic or it can contain a plurality of olefinic double bonds, as desired.

The antioxidants of this invention can be used alone or in conjunction with known antioxidants. These additive materials, i. e., the rubber antioxidants, can be incorporated with the natural rubber in any suitable manner. I prefer to incorporate the antioxidant with the natural rubber during the mastication of the raw rubber while it is processed along with the filler, vulcanizang agent, accelerator, softener, the activator of acceleartion, and the like. In this manner the additive material is dispersed throughout the rubber mass during the mixing which is generally carried out on the mill or in a mixer of the Banbury type. I generally prefer to incorporate from 0.1 to 2.5 parts by weight of the additive material with 100 parts by weight of natural rubber, preferably from about 0.2 to 1.2 parts by weight per 100 parts by weight of rubber, depending upon the use to which the final vulcanized rubber product is to be put. The vulcanizable rubber composition containing the antioxidant additive is vulcanized in the usual manner.

Vulcanizable rubber compositions usually contain fillers, modifiers, softeners, tackifiers, and plasticizers, vulcanizing agents and vulcanization accelerators. The antioxidant additives of this invention can be utilized in all of such commonly used compounding recipes.

Carbon black is added to many rubber mixes during compounding as a filler. There are many types of carbon blacks used today in compounding rubber, among which are: recently developed high pH furnace carbon blacks having a pH of from 8.0 to 10.5, usually 8.6 to 10.1, such as high abrasion furnace cabon blacks (HAF blacks) and high modulus furnace carbon blacks (HMF blacks); reinforcing furnace blacks (RF blacks) and very fine furnace blacks (VFF blacks); easy, medium, or hard processing channel blacks; lamp blacks, fine and medium thermal carbon blacks; acetylene carbon blacks; semi-reinforcing furnace carbon blacks; conductive furnace and conductive channel carbon blacks; and high elongation furnace carbon blacks. Other pigments, such as ferric oxide, magnesium carbonate, titanium dioxide, zinc oxide, hydrated alumina, kieselguhr, slate dust, zinc peroxide, zinc chloride, lead peroxide, lead oxide, chlorinated paraffins, glue, barytes, fossil flour, lithopone, various clays, whiting, etc., can be added as fillers or to modify the properties of the vulcanizable composition or vulcanized composition, such properties as the rate of cure, resistance to scorching during processing, activation of acceleration, etc.

Among the various known softeners, tackifiers and plasticizing substances compounded with natural rubber are included vegetable oils, such as palm oil, rape oil, olive oil, linseed oil, castor bean oil, soya bean oil, tung oil; bitumens including so-called mineral rubbers, which comprise natural products, such as gilsonite, rafaelite,, and also high-boiling petroleum residues, asphalts, etc.; pine tar; paraffin wax; mineral paraffins; fatty acids, such as oleic acid, stearic acid, palmitic acid, lauric acid, etc.; ceresin; naphthalenes; rosin; wool grease; carnauba wax; the many organic chemical compounds, such as glycerol, glyceryl monostearate, glyceryl monooleate, glyceryl monoricinoleate, trioctyl phosphate, triglycol dioctoate, ethylene glycol monostearate and the monooleate, phenol-formaldehyde thermosetting resins, poly-alphamethyl styrene, and other polymers of stryene and substituted styrene, dioctyl phthalate, dioctyl sebacate, polybutenes, zinc resinate, coumarone resins, dihydroabietic acid, etc. Most of these compounds aid tackiness as well as soften or plasticize the rubber. Also, some of them exhibit modifying characteristics.

Vulcanizing agents are added to vulcanize the rubber during the vulcanization step of processing. There is a wide variety of vulcanizing agents, such as: sulfur, including powdered sulfur, or in one or more other forms, and mixtures thereof; so-called plastic sulfurs; sulfur-containing compounds, such as sulfur chloride, hydrogen sulfide, sulfur thiocyanate, tetraalkylthiuram disulfides, etc.; selenium; tellurium; benzoyl peroxide; trinitrobenzene; dinitrobenzene; nitrobenzene; quinones; certain inorganic oxidizing agents; diazoaminobenzene and its derivatives; other nitrogen-containing compounds, etc.

Ordinarily it is desirable to add an accelerator of vulcanization to accelerate the action of the vulcanizing agent during the vulcanization step. There are many known accelerators of vulcanization, such as: thioureas, thiophenols; mercaptans; dithiocarbamates, xanthates, trithiocarbonates, dithio acids; mercaptothiazoles; mercaptobenzothiazoles; thiuram sulfides; etc., and various mixtures thereof. Some widely used and particularly good accelerators are, for instance, mercaptobenzothiazole, benzothiazyl disulfide, diphenylguanidine, zinc salt of mercaptobenzothiazole, zinc benaothiazyl sulfide, tetramethylthiuram and tetraethylthiuram monosulfide, tetramethylthiuram and tetraethylthiuram disulfide, N-cyclohexyl-2-benzothiazole sulfenamide, aldehyde-ammonias, triphenylguanidine, zinc butyl and zinc dimethyl dithiocarbamate, many others, and mixtures thereof.

Unvulcanized natural rubber compositions of the type described above and containing an antioxidant of my invention are vulcanized in the usual manner and can be used for many purposes. For example, the vulcanizates so produced can be used as tire tubes, tire treads, tire casings, shoe soles and heels, raincoats, table covers, hose for the transmission of fluids, belts, balloon coverings, printers rolls, printers blankets, engraving plates, aprons, gloves, masks, tanks, battery cases, friction tape mats, wire insulation, etc. In the above set forth uses the compositions of my invention have good aging characteristics.

The antioxidants of this invention are particularly well applied to produce tire tread vulcanizates. In compounding a vulcanizable mixture to be vulcanized to form a tire tread stock, it is generally desirable to use the following ingredients in the proportions set forth: carbon black, preferably a high pH furnace carbon black, in an amount of from 35 to 65 parts by weight per 100 parts by weight of rubber; zinc oxide in an amount of from 2.5 to 6 parts by weight per 100 parts by weight of rubber; fatty acid, preferably stearic acid, in an amount from 1 to 5 parts by weight per 100 parts by weight of rubber; plasticizer and softener, preferably high-boiling hydrocarbon plasticizer and softener, in an amount from 1 to 8 parts by weight per 100 parts by weight of rubber; vulcanizing agent in an amount of from 1 to 4.5, preferably sulfur, in an amount of from 1.4 to 3, parts by weight per 100 parts by weight of rubber; organic accelerator in an amount of from 0.25 to 3.5, preferably N-cyclohexyl-2-benzothiazole sulfenamide, in an amount of from 0.35 to 0.65, or mercaptobenzothiazole in an amount of from 0.6 to 1.5, or benzothiazyl disulfide in an amount of from 0.6 to 1.5 parts by weight per 100 parts by weight of rubber; and an antioxidant of this invention in an amount of from 0.2 to 1.2 parts by weight per 100 parts by weight of natural rubber.

Preparation of the antioxidant materials of my invention can be effected in any suitable manner. In many instances I prefer to utilize the reaction product of a sulfenyl halide, characterized by the structural formula RSX wherein R is an alkyl radical containing from 2 to 10 carbon atoms in the molecule and wherein X is a halogen selected from the group consisting of chlorine, bromine and iodine, and an amine containing olefin carbon-to-carbon unsaturation as for example one represented by the structural formula

wherein each R' is selected from the group consisting of H, and a hydrocarbon alkenyl radical containing from 3 to 20 carbon atoms, and wherein not more than one R' is H.

One of my preferred antioxidant materials can be prepared by the ammoniation of 1,3-butadiene to form a butenylamine followed by the reaction of the butenylamine so produced with an alkyl sulfenyl halide of the type described. One method for preparing such a butenylamine is disclosed in the copending application of J. E. Mahan and K. F. Bursack, Serial No. 135,290, filed December 27, 1949. As disclosed in that copending application a conjugated hydrocarbon diene containing at least 4 carbon atoms in the molecule is reacted at a temperature of from 50–500° F. with ammonia or an organic amine in liquid phase in the presence of sodium hydride or sodamide as a catalyst to form amination product comprising mono-, di-, and trialkenyl amines. The primary and secondary amines so produced are those suitable in the preparation of an antioxidant of my invention by means of the reaction with a sulfenyl halide.

The advantages of this invention are illustrated in the following examples. The reactants and their proportions and their specific ingredients are presented as being typical and should not be construed to limit the invention unduly.

Example I

In the preparation of an antioxidant of my invention, a primary or secondary butenylamine prepared by ammoniation of 1,3-butadiene can be reacted with tertiary butyl sulfenyl chloride at a temperature of about 100° F. to produce a corresponding sulfenamide which can be incorporated with natural rubber as an antioxidant therefor to produce a novel vulcanizable composition, or a vulcanizate, of my invention.

In carrying out the preparation of such a butenylamine, 1,3-butadiene was charged to an autoclave reactor together with sodium hydride as a catalyst in the following proportions:

| Materials Charged | Amount Charged, grams |
|---|---|
| 1,3-butadiene | 2,948 |
| Ammonia | 925 |
| Sodium hydride catalyst | 14 |

The reaction was conducted at 130° F. in liquid under the autogenic pressure of the reactants for a period of 3 hours. The conversion was 31.9 weight per cent based on the weight of 1,3-butadiene charged. Distillation characteristics of the effluent reaction product, less unreacted ammonia and butadiene, were as follows:

| Product Fraction | Boiling Range | Weight, grams |
|---|---|---|
| Monobutenylamine | Up to 60° C. at 760 mm. | 111.8 |
| Dibutenylamine | 60 to 98° C. at 22 mm. | 45.3 |
| Tributenylamine | 98 to 121° C. at 22 mm. | 501.2 |
| Higher boiling material [1] | 121° C. at 22 mm. to 195° C. at 2 mm. | 341.5 |
| Residue |  | 46.4 |

[1] Contains higher boiling amines including those unreactive with HCl to form a water-soluble hydrochloride.

Any of the primary or secondary amine products of the amination described above, falling within the broadest range of characteristics of the amine reactant represented by the formula

already set forth are reactive with an alkyl sulfenyl chloride, bromide or iodide to produce an antioxidant of my invention.

Example II

N,N-diallyl-S-tert-butylsulfenamide was evaluated as an antioxidant for natural rubber in the manner described hereafter.

In the preparation of the sulfenamide, 0.413 mol of di-tert-butyl disulfide in one liter of isopentane was refluxed and stirred during addition thereto of 0.413 mol of chlorine to form a solution containing 0.825 mol of tert-butyl sulfenyl chloride. The solution thus formed was added dropwise to a mixture of 0.825 mol of diallylamine, 0.825 mol of sodium hydroxide, 100 cc. of water, and 400 cc. isopentane.

The mixture was stirred about 3 hours, water washed, dried, and freed from isopentane. The resulting pentane-free mixture was heated to 120° F. at 50 mm. mercury absolute pressure for 20 minutes. 125 grams of total reaction product was obtained. From the total reaction product was separated N,N-diallyl-S-tert-butylsulfenamide, which is characterized by a boiling point of from 50–55° C. at from 1.5 to 2.0 mm. mercury, and a refractive index, $n_D^{20}$, of about 1.4762.

The N,N-diallyl-tert-butylsulfenamide thus produced was compounded with natural rubber and other compounding ingredients in accordance with the following recipe:

| | |
|---|---|
| Natural rubber (#1 smoked sheet) | 100 |
| Philblack O [1] | 50 |
| Zinc oxide | 4 |
| Stearic acid | 3 |
| Circosal-2XH-paraflux (equal parts) [2] | 3 |
| Asphalt #6 [3] | 3 |
| Sulfur | 2 |
| Santocure [4] | 0.5 |
| Antioxidant | 1.0 |

[1] High abrasion furnace black.
[2] Circosol-2XH: a petroleum hydrocarbon softener containing hydrocarbons of high molecular weight, in the form of a heavy, viscous, transparent, pale green, odorless liquid of low volatility; specific gravity 0.940; Saybolt viscosity at 100° F., about 2000 seconds.
Paraflux: saturated polymerized hydrocarbon.
[3] Asphalt softener.
[4] N-cyclohexyl-2-benzothiazole sulfenamide.

The resulting vulcanizable composition was then cured for 30 minutes at 307° F. Physical characteristics of the vulcanizate thus formed as listed in the following tabulation were determined before aging and after aging for 24 hours and 72 hours, at 212° F.

| Antioxidant | PHR*** Antioxidant | 80° F. | | | ΔT, ° F. |
|---|---|---|---|---|---|
| | | 300 percent Modulus, p. s. i. | Tensile, p. s. i. | Percent Elongation | |
| N,N-D-S-B-S* | 1.0 | 1,500 | 3,280 | 510 | 47.9 |
| PBNA** | 1.0 | 1,490 | 3,150 | 490 | 45.6 |

OVEN AGED 24 HOURS AT 212° F.

| N,N-D-S-B-S | 1.0 | 800 | 2,220 | 390 | 48.3 |
|---|---|---|---|---|---|
| PBNA | 1.0 | 830 | 2,150 | 375 | 45.9 |

OVEN AGED 3 DAYS AT 212° F.

| N,N-D-S-B-S | 1.0 | 590 | 900 | 295 | 46.3 |
|---|---|---|---|---|---|
| PBNA | 1.0 | 600 | 840 | 275 | 45.3 |

*N,N-diallyl-S-tert-butylsulfenamide.
**Phenyl-beta-naphthylamine.
***Parts per hundred parts of rubber.

Example III

Another portion of the N,N-diallyl-tert-butylsulfenamide was compounded with natural rubber and other ingredients with the following recipe:

| | |
|---|---|
| Natural rubber (#1 smoked sheet) | 100 |
| Philblack O [1] | 50 |
| Zinc oxide | 5 |
| Stearic acid | 3 |
| Sulfur | 2 |
| Santocure [1] | 0.5 |
| Asphalt #6 [1] | 3 |
| Antioxidant | 1.0 |

[1] See Example II.

The vulcanizable stock thus formed was cured at 307° F. for 30 minutes. Physical characteristics of the resulting vulcanizate were determined prior to the aging, after 24 hours at 212° F. and after 72 hours at 212° F. These physical characteristics are tabulated as follows:

| PHR** N,N-Diallyl-tert-Butylsulfenamide | PHR** PBNA* | 80° F. | | |
|---|---|---|---|---|
| | | 300 percent Modulus, p. s. i. | Tensile, p. s. i. | Percent Elongation |
| 1 | | 1,700 | 3,360 | 475 |
| | 1 | 1,670 | 3,570 | 500 |

OVEN AGED 24 HOURS AT 212° F.

| 1 | | 1,730 | 2,200 | 350 |
|---|---|---|---|---|
| | 1 | 2,060 | 2,620 | 375 |

OVEN AGED 72 HOURS AT 212° F.

| 1 | | | 1,240 | 295 |
|---|---|---|---|---|
| | 1 | | 1,220 | 270 |

* Phenyl-beta-naphthylamine.
** Parts per hundred parts of rubber.

Included among the compounds illustrative of the antioxidants of my invention are:

N-butenyl-tert-butyl sulfenamide
N,N-dipentenyl-phenyl sulfenamide
N-dodecenyl-hexyl sulfenamide
N-heptadecenyl-cyclohexyl sulfenamide
N,N-diheptenyl-propyl sulfenamide
N,N-didecenyl-tert-hexyl sulfenamide
N-hexadecenyl-ethyl sulfenamide
N,N-dioctenyl-sec-octyl sulfenamide
N,N-dibutenyl-tert-butyl sulfenamide
N,N-dioctadienyl-tert-butyl sulfenamide As will be evident to those skilled in the art, various modifications can be made or followed, in the light of the foregoing disclosure and discussion, without departing from the spirit or scope of the disclosure or from the scope of the claims.

I claim:

1. A vulcanizable composition comprising natural rubber and a sulfenamide as an antioxidant characterized by the structural formula

and containing not more than 30 carbon atoms in the molecule, wherein R is a hydrocarbon radical containing from 2 to 10 carbon atoms, and wherein R' is selected from the group consisting of H and a hydrocarbon alkenyl radical containing from 3 to 20 carbon atoms, and wherein not more than one R' is H.

2. A composition of claim 1 containing from 0.1 to 2.5 parts by weight of said sulfenamide per 100 parts by weight of said natural rubber.

3. As a new composition, 100 parts by weight of natural rubber compounded with from 0.1 to 2.5 parts by weight of N,N-diallyl-tert-butylsulfenamide.

4. As a new composition, 100 parts by weight of natural rubber compounded with from 0.1 to 2.5 parts by weight of a butenyl alkylsulfenamide containing not more than 10 carbon atoms in the alkyl group.

5. As a new composition, 100 parts by weight of natural rubber compounded with from 0.1 to 2.5 parts by weight of N,N-dibutenyl-tert-butylsulfenamide.

6. As a new composition, 100 parts by weight of natural rubber compounded with from 0.1 to 2.5 parts by weight of N-butenyl-tert-butylsulfenamide.

7. The product of vulcanization of 100 parts by weight of natural rubber which has been vulcanized in the presence of a vulcanization agent and from 0.1 to 2.5 parts by weight of a sulfenamide characterized by the structural formula

and containing not more than 30 carbon atoms in the molecule, wherein R is a hydrocarbon radical containing from 2 to 10 carbon atoms, and wherein R' is selected from the group consisting of H and an alkenyl radical containing from 3 to 20 carbon atoms, and wherein not more than one R' is H.

8. A vulcanizate of claim 7 wherein said sulfenamide is N,N-diallyl-tert-butylsulfenamide.

9. A vulcanizate of claim 7 wherein said sulfenamide is N,N-dibutenyl-tert-butylsulfenamide.

10. A vulcanizate of claim 7 wherein said sulfenamide is N-butenyl-tert-butylsulfenamide.

11. A vulcanizate of claim 7 wherein said sulfenamide is a butenyl alkylsulfenamide containing from 2 to 10 carbon atoms in the alkyl group.

12. A vulcanizable composition comprising natural rubber, from 35 to 65 parts by weight of furnace carbon black, from 2.5 to 6 parts by weight of zinc oxide, from 1 to 5 parts by weight of fatty acid, from 1 to 8 parts by weight of plasticizer, from 1 to 4.5 parts by weight of vulcanizing agent, from 0.25 to 3.5 parts by weight of organic accelerator, and from 0.1 to 2.5 parts by weight of a sulfenamide characterized by the structural formula

and containing not more than 30 carbon atoms in the molecule, wherein R is a hydrocarbon radical containing from 2 to 10 carbon atoms, and wherein R' is selected from the group consisting of H and a hydrocarbon alkenyl radical containing from 3 to 20 carbon atoms, and wherein not more than one R' is H.

13. A composition of claim 12 wherein said carbon black is a high pH furnace black, said fatty acid is stearic acid and said vulcanizing agent is sulfur.

14. A composition of claim 12 wherein said sulfenamide is N,N-diallyl-tert-butylsulfenamide.

15. A composition of claim 12 wherein said sulfenamide is N,N-dibutenyl-tert-butylsulfenamide.

16. A composition of claim 12 wherein said sulfenamide is N-butenyl-tert-butylsulfenamide.

17. A composition of claim 12 wherein said sulfenamide is a butenyl alkylsulfenamide containing not more than 10 carbon atoms in the alkyl group.

18. A composition of claim 1 wherein R is an alkyl radical.

19. In the vulcanization of natural rubber in the presence of a small amount of antioxidant to prevent deterioration of the vulcanized rubber, the improvement comprising incorporating into said rubber as the said antioxidant a sulfenamide characterized by the structural formula

and containing not more than 30 carbon atoms in the molecule, wherein R is a hydrocarbon radical containing from 2 to 10 carbon atoms, and wherein R' is selected from the group consisting of H and a hydrocarbon alkenyl radical containing from 3 to 20 carbon atoms, and wherein not more than one R' is H.

20. The improvement of claim 19 wherein said sulfenamide is N,N-diallyl-tert-butylsulfenamide.

21. The improvement of claim 19 wherein said sulfenamide is N,N-dibutenyl-tert-butylsulfenamide.

22. The improvement of claim 19 wherein said sulfenamide is N-butenyl-tert-butylsulfenamide.

23. As a new composition, 100 parts by weight of natural rubber compounded with from 0.1 to 2.5 parts by weight of N,N-diheptenyl-propyl sulfenamide.

24. As a new composition, 100 parts by weight of natural rubber compounded with from 0.1 to 2.5 parts by weight of N,N-didecenyl-tert-hexyl sulfenamide.

25. The improvement of claim 19 wherein said sulfenamide is N,N-diheptenyl-propyl sulfenamide.

26. The improvement of claim 19 wherein said sulfenamide is N,N-didecenyl-tert-hexyl sulfenamide.

27. A composition of claim 1 wherein said sulfenamide is N,N-diallyl-tert-butylsulfenamide.

28. A composition of claim 1 wherein said sulfenamide is N,N-dibutenyl-tert-butyl-sulfenamide.

29. A composition of claim 1 wherein said sulfenamide is N-butenyl-tert-butylsulfenamide.

30. A composition of claim 1 wherein said sulfenamide is N,N-diheptenyl-propyl sulfenamide.

31. A composition of claim 1 wherein said sulfenamide is N,N-didecenyl-tert-hexyl sulfenamide.

References Cited in the file of this patent

UNITED STATES PATENTS

| Number | Name | Date |
|---|---|---|
| Re. 19,286 | Zaucker et al. | Aug. 21, 1934 |
| 2,339,552 | Carr | Jan. 18, 1944 |
| 2,439,734 | Himel et al. | Apr. 13, 1948 |
| 2,460,393 | Paul | Feb. 1, 1949 |
| 2,554,097 | Edmonds | May 22, 1951 |